United States Patent Office 3,732,243
Patented May 8, 1973

3,732,243
2-(p-BROMOPHENYL) - 9 - DIMETHYL-AMINO-PROPYL-9H-IMIDAZO[1,2-a]BENZIMIDAZOLE
Haruo Ogura, Tsuneo Itoh, Hiroaki Takayanagi, Yukio Yamazaki, and Hiromu Takagi, Tokyo, Japan, assignors to Sankyo Company Limited and Kodama Limited, both of Tokyo, Japan
No Drawing. Filed June 17, 1971, Ser. No. 154,214
Claims priority, application Japan, June 23, 1970, 45/54,600; June 26, 1970, 45/55,791
Int. Cl. C07d 57/02
U.S. Cl. 260—309.2               1 Claim

ABSTRACT OF THE DISCLOSURE

Imidazo[1,2-a] benzimidazole derivatives having the formula

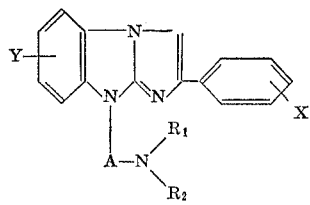

wherein X represents a halogen atom or nitro group, Y represents hydrogen atom, a halogen atom or a lower alkyl group, $R_1$ and $R_2$ may be the same or different and each represents hydrogen atom or a lower alkyl group and A represents a lower alkylene group and a pharmaceutically acceptable acid addition salt thereof. The products have pharmacological properties and are useful as analgesic agents and prepared by heating a compound having the formula

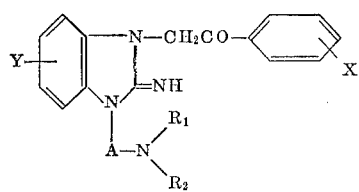

wherein X, Y, $R_1$, $R_2$ and A are the same as above or a pharmaceutically acceptable acid addition salt thereof in the presence or absence of a condensing catalyst and an inert organic solvent or reacting a compound having the formula

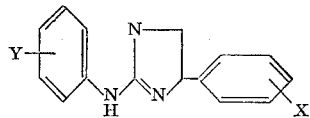

wherein X and Y are the same as above with a compound having the formula

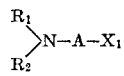

wherein $R_1$, $R_2$ and A are the same as above and $X_1$ represents an acid radical of a reactive ester in the presence of a base.

This invention relates to novel imidazo[1,2-a] benzimidazole derivatives and a process for the preparation thereof.

More particularly, it relates to imidazo[1,2-a] benzimidazole derivatives having the formula

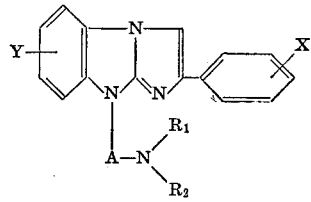

wherein X represents a halogen atom such as bromine, chlorine and fluorine or nitro group, Y represents hydrogen atom, a halogen atom such as bromide, chlorine and fluorine or a lower alkyl group such as methyl, ethyl, propyl and butyl, $R_1$ and $R_2$ may be the same or different and each represents hydrogen atom or a lower alkyl group such as methyl, ethyl, propyl and butyl and A represents a lower alkylene group such as methylene, ethylene, propylene and trimethylene and their therapeutically compatible addition salts with organic or inorganic acids, preferably the hydrochloride, hydrobromide, sulfate, nitrate, phosphate, acetate, tartrate, benzoate, citrate, maleate, malonate or fumarate.

The term "lower alkyl (alkylene)" is intended to represent a straight or branched alkyl (alkylene) group having from 1 to 5 carbon atoms.

It also relates to a process for the preparation of the imidazo[1,2-a] benzimidazole derivatives having the Formula I.

In the above Formula I, X can be substituted in ortho-, meta- or para-position of the phenyl moiety, but preferably it is substituted in para-position of the phenyl moiety. In the present invention, especially preferable compounds are imidazo[1,2-a]benzimidazole derivatives having the formula

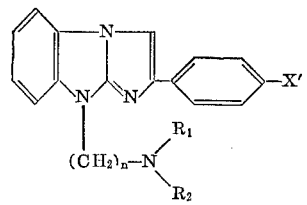

wherein X′ represents a halogen atom, $n$ is an integer of 2 or 3 and $R_1$ and $R_2$ are the same as above.

All of the imidazo[1,2-a]benzimidazole derivatives (I) of this invention are novel compounds unknown in the prior art. We have unexpectedly found that they have a potent analgesic and slight sedative action and a psychotropic action and useful as analgesic agents in medicinal area, especially surgery.

It is thus an object of the present invention to provide a new class of chemical compounds. It is another object of this invention to provide new analgesic and psychotropic compositions of matter. It is a further object of the present invention to provide a process for the preparation of chemical compounds which are useful as analgesics in medicinal area.

Heretofore, it has ben disclosed in the Journal of Pharmaceutical Chemistry (U.S.S.R.), No. 1, pp. 7–10 (1969) that 2-phenyl-9-diethylaminoethylimidazo[1,2-a] benzimidazole exhibits a hypotensive action.

The analgesic potency of the compounds of this invention is about two or three times greater than that of the prior compound and the acute toxicity of the compounds of this invention is a half of that of the prior compound.

For example, analgesic effects of 2-(p-bromophenyl)-9-dimethylaminopropylimidazo[1,2-a]benzimidazole (Example 6) and 2 - phenyl - 9 - diethylaminoethylimidazo-

[1,2-a]benzimidazole (said prior compound) were tested according to the acetic acid induced writhing syndrome method in mice [B. A. Wittle: Brit. J. Pharmacol, 22, 246 (1964)] and the $ED_{50}$ was calculated according to the method of Litchfield-Wilcoxon [J Pharmacol, Exp. Ther. 96, 99 (1949)]. According to a result of the test, $ED_{50}$ values (p.o.) of the compound of this invention and the prior compound were 6.0 (2.6–13.8) and 17.3 (10.2–29.5) mg./kg., respectively. The $LD_{50}$ values (p.o.) of the compound of this invention and the prior compound in mice were 1100 (915–1320) and 590 (531–608) mg./kg., respectively.

Therefore, the therapeutic index of analgesic effect of the compound of this invention is above three times greater than that of the prior compound.

The compounds (I) of this invention are basic and may be administered in their free form or in the form of their nontoxic acid addition salts. They may be compounded and formulated into pharmaceutical preparations in unit dosage form for oral or parenteral administration with organic or inorganic solid materials or liquids which are pharmaceutically acceptable carriers. The composition may be taken the form of tablets, powders, granules, capsules, suspensions, solutions and the like. Although the optimum quantities of these compounds to be used in such manner will depend on the particular compound employed and disease conditions and ages of a patient, the oral total daily dosage for adults is of about 50–750 mg., preferably in multiple doses such as three or more times a day.

According to the present invention, the imidazo[1,2-a] benzimidazole derivatives are prepared by (a) heating a benzimidazole derivative having the formula

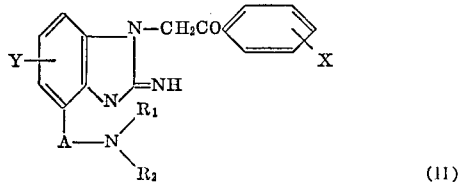

wherein X, Y, $R_1$, $R_2$ and A are the same as above or an acid addition salt thereof in the presence or absence of a condensing catalyst and an inert organic solvent or (b) reacting a compound having the formula

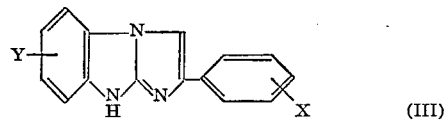

wherein X and Y are the same as above with an amine compound having the formula

wherein $R_1$, $R_2$ and A are the same as above and $X_1$ represents an acid radical of a reactive ester such as a halogen atom and tosyloxy group.

In carrying out the ring-closure reaction of benzimidazole derivatives (II), they are heated in the presence or absence of a condensing catalyst and a solvent.

When the reaction is carried out in the presence of a solvent, there may be employed any inert organic solvent without limitation that would not adversely affect the reaction. Examples of such a solvent include alcohols such as methanol, ethanol, propanol, butanol and ethylene glycol, hydrocarbons such as benzene, toluene, xylene, p-cymene, diphenyl, ethers such as diphenyl ether, tetrahydrofuran and dioxane, formamides such as dimethylformamide and a mixture thereof. When the reaction is carried out in the presence of a condensing catalyst, there may be employed any catalyst without limitation that would be generally employed in a dehydration condensation reaction. Examples of such a catalyst include acid sulfates such as acid potassium sulfate, acid sodium sulfate; active metal halogenides such as anhydrous zinc chloride and anhydrous aluminum chloride; inorganic acids such as hydrochloric acid, sulfuric acid, phosphoric anhydride and polyphosphoric acid and organic acids such as propionic anhydride, acetic anhydride and p-toluenesulfonic acid. The reaction is preferably conducted using acid addition salts of the compound (II) as the starting material. The reaction temperature is not critical but the reaction is accelerated by heating. When a solvent is employed, it is preferable to conduct the reaction at a reflux temperature. When a solvent is not employed, it is preferable to conduct the reaction at about 100–250° C.

The reaction is preferably carried out at a reflux temperature when a solvent is employed and at 100–250° C. when a solvent is not employed. The reaction period is varied mainly depending upon reaction temperature, the kind of the starting material and the presence or absence of the catalyst and solvent. It is generally from about ten minutes to about twenty hours.

After completion of the reaction, the desired product is separated from the reaction mixture by a conventional means. For instance, the desired product is obtained by directly recrystallizing the reaction mixture from a suitable solvent or distillating the solvent from the reaction mixture.

The desired product thus obtained is, if necessary, further purified by recrystallization. The desired product by the above-mentioned method is obtained in a free from or acid addition salt from depending upon the reaction condition or a kind of the starting material.

In the reaction of the compound (III) with the amine (IV), an acid is formed and therefore the reaction is preferably carried out by using a base as a catalyst or using the compound (III) in the form of an alkali or alkaline earth metal salt.

The compound (III) is usually stable in the form of an acid addition salt and may be used in the salt form or in a free form. As the base, there may be preferably used a basic alkali or alkaline earth metal compound.

Examples of such a base include alkali or alkaline earth metal hydrides such as sodium hydride, lithium hydride, calcium hydride; alkali or alkaline earth metal amides such as sodium amide, potassium amide and calcium amide; alkali or alkaline earth metal alkoxides such as sodium ethoxide, potassium t-butoxide and calcium ethoxide; alkali metal hydroxides such as sodium hydroxide and potassium hydroxide.

The reaction is easily carried out by conducting the compound (III) with the amine (IV). Most preferably the reaction is carried out by reacting the compound (III) with an alkali or alkaline earth metal in liquid ammonia or an alkylamine to give the alkali or alkaline earth metal salt of the compound (III) and reacting the latter compound with the amine (IV). As a solvent, there may be employed any inert organic solvent without limitation that would not adversely affect the reaction. Examples of such a solvent include alcohols such as methanol, ethanol and butanol; hydrocarbons such as benzene, toluene and xylene; ethers such as dioxane and tetrahydrofuran; and a mixture thereof. The reaction temperature is not critical but the reaction is preferably carried out by contacting the base with the compound (III) at a relatively lower temperature, for example, at room temperature or below and then reacting the reaction product with the amine (IV) at a relatively higher temperature, for example, about 70–100° C. The reaction period is varied mainly depending upon the reaction temperature and a kind of the reaction solvent. It is usually several hours.

After completion of the reaction, the desired product is separated from the reaction mixture by a conventional means. For instance, water is added to the reaction mixture and precipitates, if formed, are removed. When the desired product is present in a free form, the solution is extracted with a suitable solvent such as ether. When the desired product is present in an acid addition salt form, the solution is made alkaline and extracted with a suitable solvent such as ether. The extract is washed with water and dried with a drying agent such as anhydrous sodium sulfate and the solvent is distilled off to give the desired product in a free form. Alternatively, the extract mentioned above is concentrated and to the concentrate is added hydrogen chloride gas, hydrochloric acid or other acid which may be formed a pharmaceutically acceptable acid addition salt, for example, sulfuric cid, nitric acid, hydrogen bromide, acetic acid, oxalic acid, furamic acid, lactic acid and tartaric acid. The salt is purified by a conventional means, for example, recrystallization. The acid addition salt and the free form may be, if necessary, converted each other by a conventional means.

The following examples are presented to further illustrate the present invention.

EXAMPLE 1

2-(p-chlorophenyl)-9-diethylaminoethyl-9H-imidazo-[1,2-a]benzimidazole (a–1) One gram of 1-diethylaminoethyl-2-imino-3-(p-chlorophenacyl)-benzimidazole hydrobromide is heated at 190–200° C. in an oil bath for 10 minutes. After cooling, the reaction product is recrystallized from chloroform to give crude crystals of the desired product as hydrobromide. The yield is 75%. The crystals are further recrystallized from ethanol to give the hydrobromide of the desired product as white needles melting at 187–190° C.

(a–2) One gram of 1-diethylaminoethyl-2-imino-3-(p-chlorophenacyl)-benzimidazole hydrobromide is dissolved in 30 ml. of ethanol and the solution is refluxed for 10–12 hours. After completion of the reaction, the ethanol is distilled off to give crude crystals of the desired product as its hydrobromide. The yield is 68%. The crystals are further recrystallized from methanol to give the hydrobromide of the desired product as white needles melting at 187–190° C.

(b) In 150 ml. of liquid ammonia are dissolved 0.011 mole of sodium amide and, with stirring, 0.01 mole of 2 - (p - chlorophenyl)-9H-imidazo[1,2-a]benzimidazole. The ammonia is evaporated at room temperature with stirring. The residue is nearly dissolved in 150 ml. of toluene with stirring for one hour. To the resulting solution is added 0.01 mole of diethylaminoethyl chloride in 50 ml. of anhydrous toluene. The reaction mixture is stirred at room temperature for one hour and further at 90° C. for 3 hours. The reaction mixture is allowed to stand overnight.

To the reaction mixture is added water and the precipitates thus formed are removed. The toluene layer of the mixture is separated and dried over anhydrous sodium sulfate. The toluene is distilled off under reduced pressure. The residue is dissolved in ether and hydrogen chloride gas is introduced into the solution to precipitate the hydrochloride. The crystals are recrystallized from a mixture of ether and methanol to give the desired product as white needles melting at 258–259° C. (with decomposition). The yield is 68%.

EXAMPLE 2

2-(p-bromophenyl)19-diethylaminoethyl-9H-imidazo-[1,2-a]benzimidazole (a–1) Following the procedure of Example 1(a–1), but replacing the 1 - diethylaminoethyl - 2-imino-3-(p-chlorophenacyl)-benzimidazole hydrobromide with 1-diethylaminoethyl - 2 - imino - 3 - (p-bromophenacyl) benzimidazole hydrobromide, there is obtained the hydrobromide of the desired product as white needles melting at 187° C. The yield is 78%.

(a–2) Following the procedure of Example 1(a–2), but replacing the 1 - diethylaminoethyl-2-imino-3-(p-chlorophenacyl) - benzimidazole hydrobromide with 1-diethylaminoethyl - 2-imino-3-(p-bromophenacyl)benzimidazole hydrobromide, there is obtained the hydrobromide of the desired product as white needles melting at 187° C. The yield is 78%.

(b) In 150 ml. of liquid ammonia are dissolved 0.01 mole of sodium amide and with stirring 0.01 mole of 2-(p - bromophenyl)-9H-imidazo[1,2-a]benzimidazole. The ammonia is evaporated at room temperature with stirring. The residue is reacted with 0.01 mole of diethylaminoethyl chloride according to the same procedure as in Example 1(b) to give the hydrochloride of the desired product as white needles melting at 245–248° C. (with decomposition). The yield is 65%.

EXAMPLE 3

2-(p-chlorophenyl)-9-dimethylaminoethyl-9H-imidazo [1,2-a]benzimidazole (a) Following the procedure of Example 1(a–1), but replacing the 1 - diethylaminoethyl-2-imino-3-(p-chlorophenacyl)-benzimidazole hydrobromide with 1-dimethylaminoethyl - 2-imino-3-(p-chlorophenacyl)benzimidazole hydrobromide, there is obtained the hydrobromide of the desired product as white needles melting at 190–192° C. The yield is 75%.

(b–1) In 150 ml. of liquid ammonia is dissolved 0.011 mole of sodium amide and with stirring 0.01 mole of 2- (p - chlorophenyl)-9H-imidazo[1,2-a]benzimidazole. The ammonia is evaporated at room temperature with stirring. The residue is reacted with 0.01 mole of dimethylaminoethyl chloride according to the same procedure as in Example 1. (b) to give the hydrochloride of the desired product as white needles melting at 271–272° C. (with decomposition). The yield is 71%.

(b–2) In 150 ml. of liquid ammonia is dissolved 0.011 mole of sodium and with stirring 0.01 mole of 2-(p-chlorophenyl)-9H-imidazo[1,2-a]benzimidazole. The ammonia is evaporated at room temperature with stirring. The residue is reacted with 0.01 mole of dimethylaminoethyl chloride according to the same procedure as in Example 1(b) to give the hydrochloride of the desired product as white needles melting at 271–272° C. (with decomposition). The yield is 68%.

(b–3) In 100 ml. of absolute ethanol is dissolved 0.011 mole of sodium and with stirring 0.01 mole of 2-(p-chlorophenyl) - 9H-imidazo[1,2-a]benzimidazole. To the resulting solution is added 0.01 mole of dimethylamino ethyl chloride in 30 ml. of absolute ethanol. The reaction mixture is stirred at room temperature for one hour and further at 90° C. for 3 hours. The reaction mixture is allowed to stand overnight. To the reaction mixture is added water and the precipitates thus formed are removed. The mixture is extracted with ether. The extract is dried over anhydrous sodium sulfate. Hydrogen chloride gas is introduced into the solution to precipitate the hydrochloride of the desired product as white needles melting at 271–272° C. (with decomposition). The yield is 55%.

EXAMPLE 4

2-(p-bromophenyl)-9-dimethylaminoethyl-9H-imidazo [1,2-a]benzimidazole (a) Following the procedure of Example 1(a–1), but replacing 1 - diethylaminoethyl-2-imino-3-(p-chlorophenacyl)benzimidazole hydrobromide with 1-dimethylaminoethyl - 2-imino-3-(p-bromophenacyl)benzimidazole hydrobromide, there is obtained the hydrobromide of the desired product as white needles melting at 218–219° C. The yield is 65%.

(b) In 150 ml. of liquid ammonia is dissolved 0.011 mole of sodium amide and with stirring 0.01 mole of 2- (p-bromophenyl) - 9H-imidazo[1,2-a]benzimidazole. The ammonia is evaporated at room temperature with stirring. The residue is reacted with 0.01 mole of dimethylaminoethyl chloride according to the same procedure as in Example 1(b) to give the hydrochloride of the desired product as white needles melting at 268–270° C. (with decomposition). The yield is 62%.

EXAMPLE 5

2-(p-chlorophenyl)-9-dimethylaminopropyl-9H-imidazo[1,2-a]benzimidazole

In 150 ml. of liquid ammonia is dissolved 0.016 mole of sodium amide and, with stirring, 0.015 mole of 2-(p-chlorophenyl)-9H-imidazo[1,2-a]benzimidazole. The ammonia is evaporated at room temperature with stirring. The residue is reacted with 0.015 mole of dimethylaminopropyl chloride according to the same procedure as in Example 1(b) to give the hydrochloride of the desired product as white needles melting at 266–267° C. (with decomposition). The yield is 93%.

EXAMPLE 6

2-(p-bromophenyl)-9-dimethylaminopropyl-9H-imidazo[1,2-a]benzimidazole

In 150 ml. of liquid ammonia is dissolved 0.011 mole of sodium amide and with stirring 0.01 mole of 2-(p-bromophenyl)-9H-imidazo[1,2-a]benzimidazole. The ammonia is evaporated at room temperature with stirring. The residue is reacted with 0.01 mole of dimethylaminopropyl chloride according to the same procedure as in Example 1(b) to give the hydrochloride of the desired product as white needles melting at 249–250° C. (with decomposition). The yield is 57%.

What is claimed is:
1. 2 - (p - bromophenyl)-9-dimethylaminopropyl-9H-imidazo[1,2-a]benzimidazole.

References Cited

FOREIGN PATENTS

| | | | |
|---|---|---|---|
| 230,827 | 3/1969 | USSR | 260—309.2 |
| 2,003,825 | 12/1970 | Germany | 260—309.2 |
| 659,446 | 3/1963 | Canada | 269—309.2 |

OTHER REFERENCES

Ivanovskaya, Chem. Abst., vol. 73, No. 75494e (1970), QD1·A51.

Simonov et al.: Chem. Abst., vol. 71, No. 81267h (1969), QD1·A51.

Kocherjin et al.: Chem. Abst., vol. 70, No. 96712c (1969), QD1·A51.

Simonov et al.: Chem. Abst., vol. 73, No. 109739f (1970), QD1·A51.

Werbel et al.: J. Heterocyclic Chem., vol. 2, pp. 287–90 (1965), QD400·J6.

Chemical Abstracts Subject Index (A-Ison) (July-December 1970), vol. 73, p. 1850s (1971), QDI·A51.

NATALIE TROUSOF, Primary Examiner

U.S. Cl. X.R.

424—273

UNITED STATES PATENT OFFICE
CERTIFICATE OF CORRECTION

Patent No. 3,732,243　　　　　　　Dated May 8, 1973

Inventor(s)　　　HARUO OGURA et al

It is certified that error appears in the above-identified patent and that said Letters Patent are hereby corrected as shown below:

Column 1, lines 52-57, third formula, the formula should be written as follows:

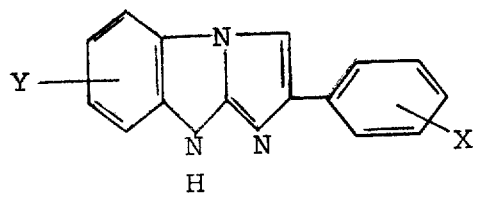

Column 2, line 14, rewrite "bromide" as ---bromine--- .

Column 3, lines 35-40 - Formula (II), the formula should be written as follows:

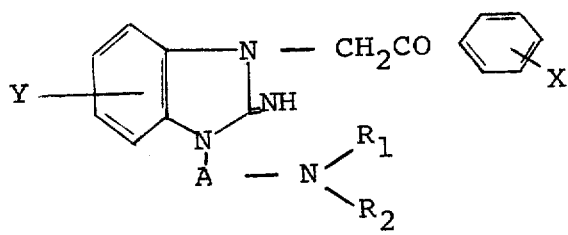

Column 4, lines 29 and 30, rewrite "from" as ---form---.

Column 5, line 11, rewrite "furamic" as ---fumaric--- .

Column 5, line 62, rewrite "19" as --- -9 --- .

Signed and sealed this 1st day of January 1974.

(SEAL)
Attest:

EDWARD M. FLETCHER, JR.　　　　　RENE D. TEGTMEYER
Attesting Officer　　　　　　　　Acting Commissioner of Patents